UNITED STATES PATENT OFFICE.

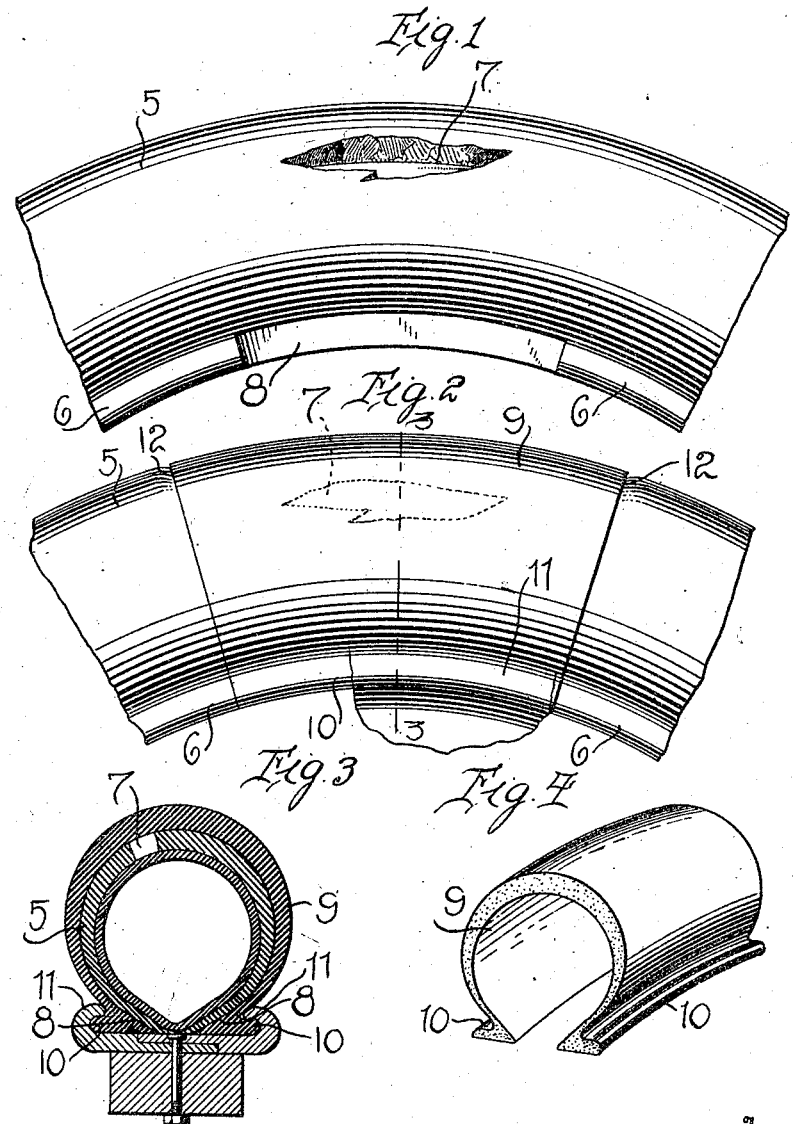

LEON G. HARDENBROOK, OF LYNDEN, WASHINGTON, ASSIGNOR OF ONE-THIRD TO WATSON R. ST. JOHN, OF ALGER, WASHINGTON.

METHOD AND MEANS FOR REPAIRING PNEUMATIC TIRES.

1,136,900.

Specification of Letters Patent.

Patented Apr. 20, 1915.

Application filed December 30, 1914. Serial No. 879,751.

*To all whom it may concern:*

Be it known that I, LEON G. HARDENBROOK, a citizen of the United States, residing at Lynden, in the county of Whatcom and State of Washington, have invented certain new and useful Improvements in Methods and Means for Repairing Pneumatic Tires, of which the following is a specification, reference being had to the accompanying drawings.

This invention relates to an improved method and means for patching pneumatic tires, and has for its primary object to provide a simple and effective means and method of applying the same to a pneumatic tire which will effectually close a puncture therein and preclude all possibility of the escape of air or the entrance of water.

Considered in its more specific aspect, the present invention contemplates the provision of a tire patch consisting of a section conforming in transverse contour to the tire to be repaired, which may be cut from an old tire, said patch section having beads upon its opposite ends, the beads of the tire upon which the rim flanges are adapted to be clenched being cut away to receive the beads of the tire patch, whereby said patch is tightly drawn and clamped upon the periphery of the tire when the same is applied to the rim and secured thereon.

With the above and other objects in view, my invention consists in the novel features of construction, combination, and arrangement of parts to be hereinafter more fully described, claimed, and illustrated in the accompanying drawing, in which, Figure 1 is an elevation of a portion of an automobile tire, showing the same punctured and prepared for the application of my improved shoe or patch thereto; Fig. 2 is a similar view showing the repair patch applied; Fig. 3 is a transverse section taken on the line 3—3 of Fig. 2; and Fig. 4 is a detail perspective view of the patch or shoe.

Referring in detail to the drawing, 5 designates the ordinary pneumatic tire such as is commonly employed upon automobiles and other motor vehicles. The longitudinal edges of the tire are provided with continuous outwardly projecting beads 6. In Fig. 1, it will be noted that the tire has been punctured, as at 7. The two longitudinal beads 6 of the tire are cut away and removed from the tire body, as indicated at 8, such cut away portions of the beads extending beyond the opposite ends of the puncture 7.

My improved patch or tire shoe, generally indicated by the numeral 9, is of substantially the same diameter as the tire to be repaired, and conforms in cross-sectional contour therewith. This patch or shoe which may be constructed of rubber fabric or other suitable material, is of sufficient length to entirely cover the puncture or hole 7 and is provided upon its opposite ends with outwardly projecting beads 10 corresponding in cross-sectional area and shape to the beads 6 of the tire. These beads 10 are adapted to be received in the gaps or spaces 8 from which, sections of the beads 6 on the tire are cut.

After applying the tire patch or shoe to the tire in the manner above stated, the tire is arranged upon the wheel rim and the inturned flanges of the rim plates or sections indicated at 11 engaged over the beads 6 and 10. In the clamping or clenching action of the rim sections upon the beads of the tire and the patch, said patch is drawn inwardly until the beads 10 thereon are in alinement with the beads 6 of the tire, so that the periphery of said tire is compressed, as indicated at 12. Thus, a very tight and secure clamping action of the shoe or patch upon the tire, is obtained, and the puncture or hole therein effectually closed. The tire patch being of water proof material, absolutely prevents the entrance of water or other foreign matter to the interior of the tire, and also obviates all liability of injury to the inner tube.

From the foregoing description, taken in connection with the accompanying drawing, the construction of my improved tire patch or shoe and the method of using or applying the same will be fully and clearly understood. The shoes or patch sections may be cut from an old tire, or they may be separately manufactured and sold.

The device, while extremely simple in its construction, is, nevertheless, highly serviceable and efficient in practical use, and provides a very convenient emergency tire patch which may be readily applied by the individual user without necessitating the employment of a skilled workman.

I have above referred to the preferred form and construction of the device; but it will be understood that the same is susceptible of considerable modification therein and I, therefore, reserve the privilege of adopting all such obvious modifications as may be fairly embodied within the spirit and scope of the invention as claimed.

Having thus fully described my invention, what I desire to claim and secure by Letters Patent is:—

1. The herein described method of repairing a punctured tire which consists in cutting away sections of the longitudinal tire beads, then applying to said tire over the puncture, a patch section conforming in cross-sectional contour and in diameter to the tire and having beads upon its ends to be received in the spaces provided by cutting away the beads of the tire, and then applying the tire with the patch to the wheel rim and clenching the rim upon said beads whereby the patch is drawn inwardly into clamping engagement upon the wheel tire.

2. A patch for repairing punctured pneumatic tires consisting of a flexible patch member conforming in cross-sectional contour to the tire and having beads upon its opposite ends, the longitudinal beads of the tire being cut away, such cut away portions extending beyond the opposite ends of the puncture, and the beads upon the patch member being engaged by the clenching flanges of the wheel rim and drawn into the spaces thus provided in the tire beads, and said patch member clamped upon the wheel tire and caused to exert a compressing action upon the same whereby the puncture is closed.

3. A tire patch consisting of a patch member conforming in cross-sectional contour and diameter to the tire to be patched and having beads upon its opposite ends, the tire to be repaired having its longitudinal beads cut away, such cut away portions extending upon opposite sides of the puncture in the tire, said patch member being adapted for engagement upon the tire over the puncture therein and the beads thereon engaged by the clenching flanges of the wheel rim and drawn into the spaces in the tire beads whereby said patch is clamped upon the periphery of the tire and caused to exert a compressing action upon the same.

In testimony whereof I hereunto affix my signature in the presence of two witnesses.

LEON G. HARDENBROOK.

Witnesses:
   W. B. VANDER GRIEND,
   P. M. SENNRIN.